(12) United States Patent
Wilson, II

(10) Patent No.: US 8,004,133 B2
(45) Date of Patent: Aug. 23, 2011

(54) EPITROCHOIDAL ELECTRIC MOTOR

(75) Inventor: Felix Wilson, II, Wichita, KS (US)

(73) Assignee: FW2 International, Inc., Denver, CO (US)

( * ) Notice: Subject to any disclaimer, the term of this patent is extended or adjusted under 35 U.S.C. 154(b) by 236 days.

(21) Appl. No.: 12/493,169

(22) Filed: Jun. 27, 2009

(65) Prior Publication Data
US 2010/0327683 A1  Dec. 30, 2010

(51) Int. Cl.
*H02K 7/06* (2006.01)

(52) U.S. Cl. ............................................ 310/83; 310/99

(58) Field of Classification Search ............... 310/82–83, 310/99, 216.53, 267, 268
See application file for complete search history.

(56) References Cited

U.S. PATENT DOCUMENTS

| | | | |
|---|---|---|---|
| 2,988,008 A | 6/1961 | Wankel | |
| 3,329,132 A * | 7/1967 | De Coye De Castelet | ... 123/206 |
| 3,343,526 A * | 9/1967 | Peras | ........................ 123/196 R |
| 3,711,225 A * | 1/1973 | Kolbe et al. | ................... 417/440 |
| 3,913,408 A * | 10/1975 | Moore | ............................... 74/63 |
| 4,551,645 A | 11/1985 | Takahashi | |
| 4,914,330 A * | 4/1990 | Pierrat | ........................... 310/82 |
| 5,168,846 A * | 12/1992 | Paul et al. | ...................... 123/202 |
| 5,722,815 A * | 3/1998 | Cozens | ......................... 417/310 |
| 6,520,754 B2 * | 2/2003 | Randolphi | ..................... 417/420 |
| 6,997,438 B2 * | 2/2006 | Fauni | ............................ 251/305 |
| 7,028,979 B2 * | 4/2006 | Fauni | ........................ 251/129.12 |
| 7,611,340 B2 * | 11/2009 | Hwang et al. | ..................... 418/9 |

OTHER PUBLICATIONS

International Search Report and Written Opinion dated Jan. 27, 2011, PCT App. No. PCT/US2010/040121.

* cited by examiner

*Primary Examiner* — Thanh Lam
(74) *Attorney, Agent, or Firm* — Russell S. Krajec; Krajec Patent Office, LLC

(57) ABSTRACT

An electric motor contains a mechanical mechanism that causes a rotor to move in an epitrochoidal path. Disposed around the epitrochoidal path are stators that may impel or force the rotor to rotate. The mechanical mechanism that creates the epitrochoidal path may consist of an output shaft with an eccentric lobe, where the rotor revolves around the eccentric lobe. A fixed mounted sun gear may engage a ring gear mounted to the rotor to cause the epitrochoidal motion. Some embodiments may have two or more rotors, and may include controllers with feedback sensors to operate the electric motor at a specific speed or to control the speed as defined in a speed profile.

20 Claims, 2 Drawing Sheets

EPITROCHOIDAL ELECTRIC MOTOR

BACKGROUND

Many different types of rotational electric motors have been developed. The motors include motors that operate using Direct Current (DC) or Alternating Current (AC), and may include constant speed motors and variable speed motors. Additionally, linear motors have been developed that create linear force, rather than rotational torque.

SUMMARY

An electric motor contains a mechanical mechanism that causes a rotor to move in an epitrochoidal path. Disposed around the epitrochoidal path are stators that may impel or force the rotor to rotate. The mechanical mechanism that creates the epitrochoidal path may consist of an output shaft with an eccentric lobe, where the rotor revolves around the eccentric lobe. A fixed mounted sun gear may engage a ring gear mounted to the rotor to cause the epitrochoidal motion. Some embodiments may have two or more rotors, and may include controllers with feedback sensors to operate the electric motor at a specific speed or to control the speed as defined in a speed profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An electric motor may have an internal mechanism that causes a rotor to move in an epitrochoidal path. Disposed around the epitrochoidal path may be stators that cause the rotor to rotate about the path and cause a driveshaft to turn. The internal mechanism of an illustrated embodiment may increase the speed of the rotation of the driveshaft to three times that of the rotor. Other embodiments may have different speed increases due to different configurations.

The motor may use different types of electrical forcers to cause the motor to turn. The forcers may be constructed as various direct current (DC) and alternating current (AC) forcer types. Some embodiments may use electromagnets or permanent magnets on a forcer component.

The internal mechanism may comprise a rotor which may rotate on an eccentric component of a driveshaft. A fixed mounted sun gear may engage a ring gear mounted to the rotor, and the assembly may rotate where the driveshaft speed is faster than the rotor speed.

The rotor may have multiple lobes on which the electrical forcer may act. In an example embodiment illustrated in this specification, a three lobed rotor is illustrated. Each lobe may contain a rotor component of an electrical forcer. Some embodiments may have stator forcer components located at the extents of the epitrochoidal path. In such embodiments, the stator forcer components may be segments that apply force during a segment of the rotor's path. Other embodiments may have stator forcer components and/or rotor forcer components that encompass some or all of the rotor's path.

Some embodiments may have two or more rotors. In such embodiments, the rotors may be configured to be offset from each other such that each rotor moves in a epitrochoidal path that is complementary to the other rotors. In such embodiments, a rotor may be positioned so that it travels the epitrochoidal path out of phase with another rotor.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

Figure 1:
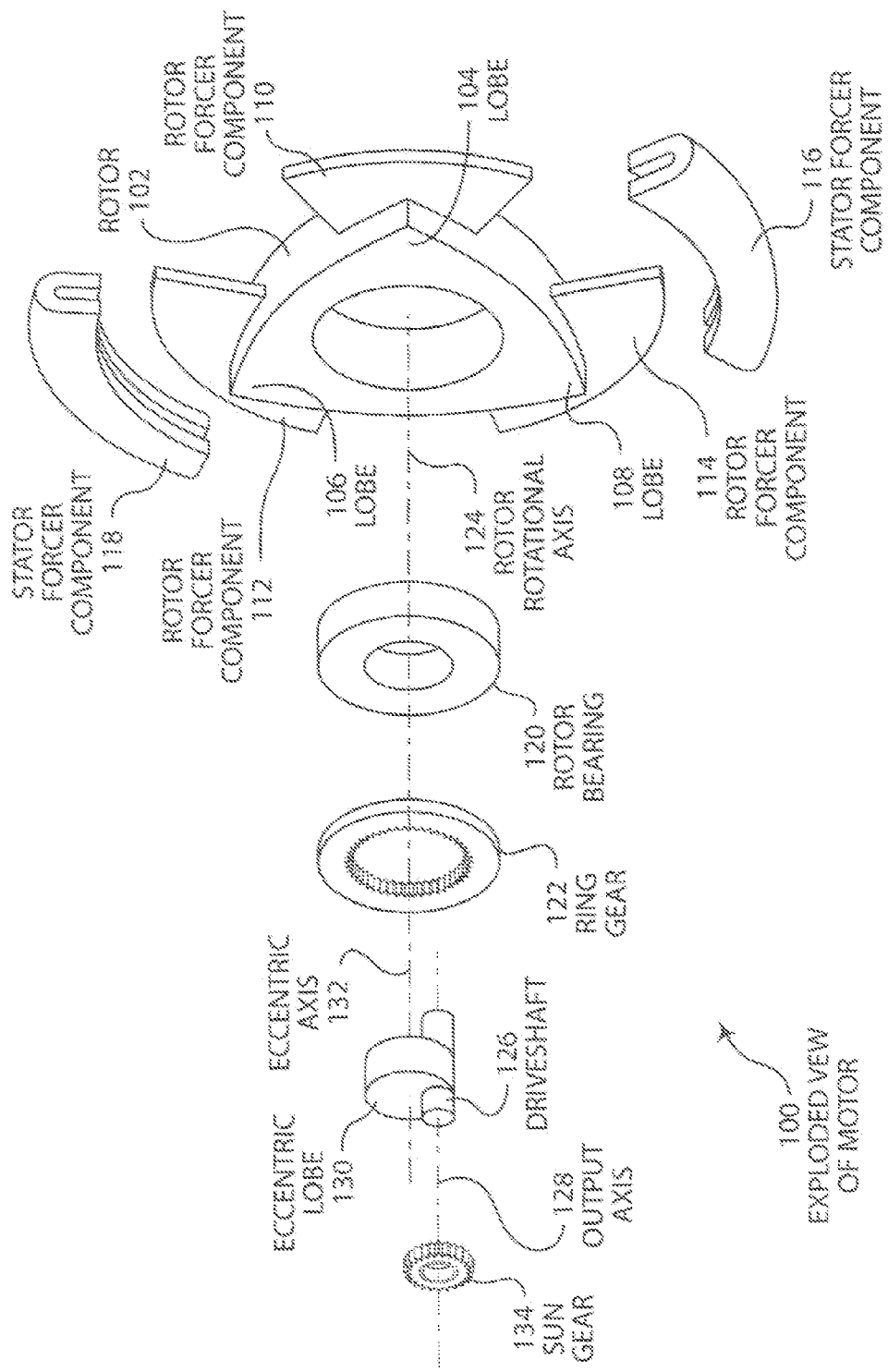
FIG. 1 is a diagram illustration of an embodiment showing an exploded view of an electric motor with an epitrochoidal path.

FIG. 1 is a diagram of an embodiment 100 showing an exploded view of an electrical motor with an epitrochoidal motion. Embodiment 100 is an example of one embodiment of such an electric motor.

Embodiment 100 illustrates the major components of an electric motor. The components are illustrated in an exploded view in order to show the general shape and configuration of the components. Embodiment 200 presented later in this specification illustrates a plan view showing the configuration of the components shown in embodiment 100 in their assembled positions.

An epitrochoidal motion may be created by a mechanism similar to that used in a Wankel combustion engine.

Embodiment 100 illustrates an electric motor that may be powered by three rotor forcer elements and two stator forcer elements. The rotor forcer element and stator forcer element may act together to create a force that is converted into rotational motion through a mechanism described later.

The rotor forcer element and stator forcer element may be any type of mechanism by which electrical energy may be converted to translational or rotational energy. The electrical energy may be either alternating current (AC) or direct current (DC).

The forcer elements use electrical energy to create a force that causes a rotor to rotate. In some embodiments, the forcer elements may operate on a segment of a rotor's path.

In one embodiment, a forcer may use AC induction to generate eddy currents in one of the forcer components. The eddy currents may repel a magnetic field generated in the other forcer component, causing the forcer components to move with respect to each other.

In a typical AC induction forcer arrangement, a series of electromagnets may be positioned next to each other and may be powered by different phases of multiphase AC power. Each successive electromagnet may be powered by a different phase of the AC power. When AC power is applied to a first forcer element, the complementary forcer element may be propelled with respect to the first.

In some embodiments, the eddy currents may be generated in a rotor forcer component by electromagnets in the stator forcer component. In other embodiments, the rotor forcer component may comprise electromagnets which may generate eddy currents in a stator forcer component.

Induction type forcers may use slip to create torque in the motor. Slip may be the difference in speed between the change in the magnetic field and the actual change in position of the forcer components. Without slip, the eddy currents would not be created and no force would be exerted.

When the rotor forcer component is supplied with electrical power, a slip ring and brushes may be used to transfer power from a housing to the rotor while the rotor moves.

AC induction forcers may be controlled using variable frequency drives. A variable frequency drive may change the input frequency of alternating current to the powered forcer component. In some such embodiments, a sensor may detect rotational motion on the rotor or output shaft and generate an output signal that may be used by the variable frequency drive to regulate the speed of the motor.

In some embodiments, AC induction forcers may operate with single phase or two phase AC power. In a two phase embodiment, two different windings may be used to create a variable speed or controllable forcer. Such embodiments may have an AC servo amplifier, such as a linear power amplifier, to control the forcer.

In a single phase embodiment, one or more shading coils may be used in conjunction with a main coil to create a moving magnetic field. The shading coils may be created from a small number of turns, and may be created from a single turn in some cases. In such an embodiment, part of each pole may be encircled by a copper coil or strap and the induced current in the strap may oppose the change of flux through the coil. The change in flux may cause a time lag in the flux passing through the shading coil, so that the maximum field intensity may move across the pole face on each cycle. Such an arrangement may produce a low level moving magnetic field which is large enough to turn both the rotor and its attached load. As the rotor picks up speed, the torque builds up to its full level as the principal magnetic field may be moving relative to the rotating rotor.

A synchronous AC forcer design may use electromagnets on both forcer components to cause motion. One forcer component may be supplied with a DC current to create a constant magnetic field while the other forcer component may be supplied AC current to create attractive or repulsive forces. In some embodiments, AC current may be supplied to both forcer components, and in other embodiments, one forcer component may comprise one or more permanent magnets. Synchronous AC forcer designs typically may have a constant output speed regardless of load.

A DC forcer design may have one forcer component be a set of permanent magnets while the other forcer component be a set of electromagnets that may be switched on and off using a controller. The controller may regulate which electromagnets are energized to create a motive force, and may switch electromagnets on and off to create motion. In some embodiments, the set of permanent magnets may be replaced by electromagnets that may be powered by DC current, and may or may not be varied during operation.

In many AC and DC forcer designs, a feedback sensor may be used to detect the motion of the rotor or output shaft and create an output signal. The output signal may be used by the controller as a feedback sensor to regulate the speed or position of the electric motor.

In some embodiments, the feedback sensor may be a Hall effect sensor. A Hall effect sensor may be a transducer that varies output voltage in responses to changes in magnetic fields. In a typical motor embodiment, a magnet may be embedded or attached to a rotor or output shaft, and the Hall effect sensor may detect each pass of the magnet past the sensor.

In some embodiments, the feedback sensor may be an encoder, such as a rotary encoder. A rotary encoder may give an output signal that defines the position of the rotor or output shaft as opposed to its speed, which could be determined using a Hall effect sensor or some other type of sensor.

When a controller is used, a controller may have an input signal that may define a desired speed or position of the motor. In some embodiments, the input signal may define a motion profile that is desired. Such a motion profile may define changes in speed or position over time. The controller may be capable of causing the output of a sensor to follow the input signal to control the motor in a closed loop feedback system.

Embodiment 100 is an example of a three lobed rotor. The three lobed rotor may be configured to move in an epitrochoidal path through a set of gears and by rotating about an eccentric lobe of a driveshaft. The epitrochoidal path of embodiment 100 may have two major lobes and may be in the general shape of a figure-8.

Other embodiments may have different numbers of lobes on the rotor. In general, the number of lobes of the corresponding epitrochoidal path may be one less than the number of lobes of the rotor. For example, a four-lobed rotor may be caused to move in a three-lobed epitrochoidal path in the general shape of a three-leafed clover. In another example, a five-lobed rotor may be caused to move in a four-lobed epitrochoidal path similar to a four-leafed clover.

The number of stator forcer components may be generally the same as the number of lobes in the epitrochoidal path.

The rotor 102 has three lobes 104, 106, and 108. The lobes 104, 106, and 108 represent the apexes of the general triangular shaped rotor 102. In many three-lobed embodiments, the rotor 102 may be a Reuleaux triangle, a shape similar to, or approximating the Reuleaux triangle.

The rotor 102 may have a center hole that may define a rotor rotation axis 124. The rotor rotation axis 124 may be through the center point of the rotor 102. The rotor 102 may be defined by a plane perpendicular to the rotor rotation axis 124. The plane may be defined by rotor forcer components.

The rotor 102 may have three rotor forcer components 110, 112 and 114 disposed about the rotor 102 at the lobes 104, 106, and 108. As illustrated, the rotor forcer components are mounted as approximately centered over the respective lobes. Some embodiments may have rotor forcer components offset from the respective lobes by any amount. In some cases, the rotor forcer components may be positioned significantly ahead or behind the lobes with respect to the direction of travel.

The rotor forcer components 110, 112, and 114 are illustrated as blade shaped articles through which a rotor plane may be formed. In some embodiments, the blade shaped articles may be passive, such as when used with induction-type forcer systems. In such cases, a series of electromagnets may be contained in stator forcer components 116 and 118 and the excitement of the electromagnets may create eddy currents in the blade shared rotor forcer components that are made of a conducting material such as brass, steel, aluminum, copper, or other metal.

In another type of passive rotor forcer component, the permanent magnets may be mounted or embedded in the rotor forcer components. In some cases, multiple magnets may be positioned in the rotor forcer component. When multiple permanent magnets may be used, the magnets may be configured with alternating poles.

In some embodiments, the blade shaped rotor forcer components 110, 112, and 114 may be active components. In such embodiments, the rotor forcer components may contain one or more coils of wire that may produce magnetic fields when the coils are energized. In some embodiments, the rotor forcer component coils may be energized with direct current and in other embodiments, the rotor forcer component coils may be energized with alternating current. When direct current is used, the direct current may be constant or switched on and off during motion.

The stator forcer components 116 and 118 are illustrated as U-shaped components through which the blade-type rotor forcer components may rotate. A U-shaped stator component may allow active or passive components to act on both sides of a rotor forcer component. In many such embodiments, the U-shaped forcer component may allow higher forces to be applied than a single sided forcer component.

In other embodiments, the rotor forcer components may have two or more blades. In such embodiments, the rotor forcer components may act with similar shaped stator forcer components. Such embodiments may be useful in cases where higher output torque is desired. The U-shaped stator components and blade shaped rotor components as illustrated may be one configuration of a forcer mechanism. Other embodiments may have many different forcer configurations.

The stator forcer components 116 and 118 may be placed on the outer portions of an epitrochoidal path. An example of one embodiment may be shown in embodiment 200 presented later in this specification.

The rotor 102 may rotate about the rotor rotational axis 124 on a rotor bearing 120. A ring gear 122 may be attached to the rotor 102.

A driveshaft 126 may be the mechanism by which the output torque may be transmitted. The driveshaft 126 may have an eccentric lobe 130. The eccentric lobe 130 may be a circular portion of the driveshaft 126 that defines an eccentric axis 132. The eccentric axis 132 may be parallel to and offset from the output axis 128.

When assembled, the rotor bearing 120 may mount on the eccentric lobe 130 so that the rotor rotational axis 124 is coaxial with the eccentric axis 132.

A sun gear 134 may be mounted to a housing 136 that is not illustrated. The sun gear 134 may be sized so that the ring gear 122 may have exactly three times as many teeth as the sun gear 134. The sun gear 134 may engage the ring gear 122 and allow the rotor to rotate about the rotor rotation axis 124 while causing the driveshaft 126 to rotate about the driveshaft axis 128 at three times the speed of the rotor. For each full revolution of the rotor 102, the driveshaft 126 may rotate three complete revolutions.

The mechanism of the sun gear 134, driveshaft 126 with the eccentric lobe 130 and the ring gear 122 mounted to the rotor 102 may cause the lobes 104, 106, and 108 of the rotor 102 to move in an epitrochoidal path.

In some embodiments, a controller may be used to regulate the speed and/or position of the rotor 102 and the driveshaft 126. Torque may be supplied by the actions of the stator forcer components acting on the rotor forcer components and causing the rotor 102 to rotate. A controller may use various feedback mechanisms, such as Hall effect sensors, encoders, or other mechanisms to sense the actions of the rotor 102. In a typical embodiment, the controller may be supplied with an input signal that indicates the desired speed or position of the rotor 102, and the controller may use the output signal of a sensor as a feedback loop to cause the rotor 102 to match the input signal.

In some embodiments, the controller may not be used and the motor of embodiment 100 may be run without feedback or in an open loop mode.

Embodiment 100 illustrates a single rotor embodiment. In some cases, two or more rotors may be used in an electric motor. When multiple rotors are used, the various rotors may be configured to be out of phase with respect to each other. In an example embodiment, a driveshaft may have separate eccentric lobes for each rotor. On a two-rotor system, the eccentric lobes may be positioned to be 180 degrees out of phase with each other. In a three-rotor system, the eccentric lobes may be positioned to be 120 degrees out of phase with each other. Multiple rotor embodiments may have more power output and smoother operation than single rotor embodiments in some cases.

In a typical multiple rotor embodiment, the planes defined by each rotor may be parallel to and offset from each other.

Figure 2:
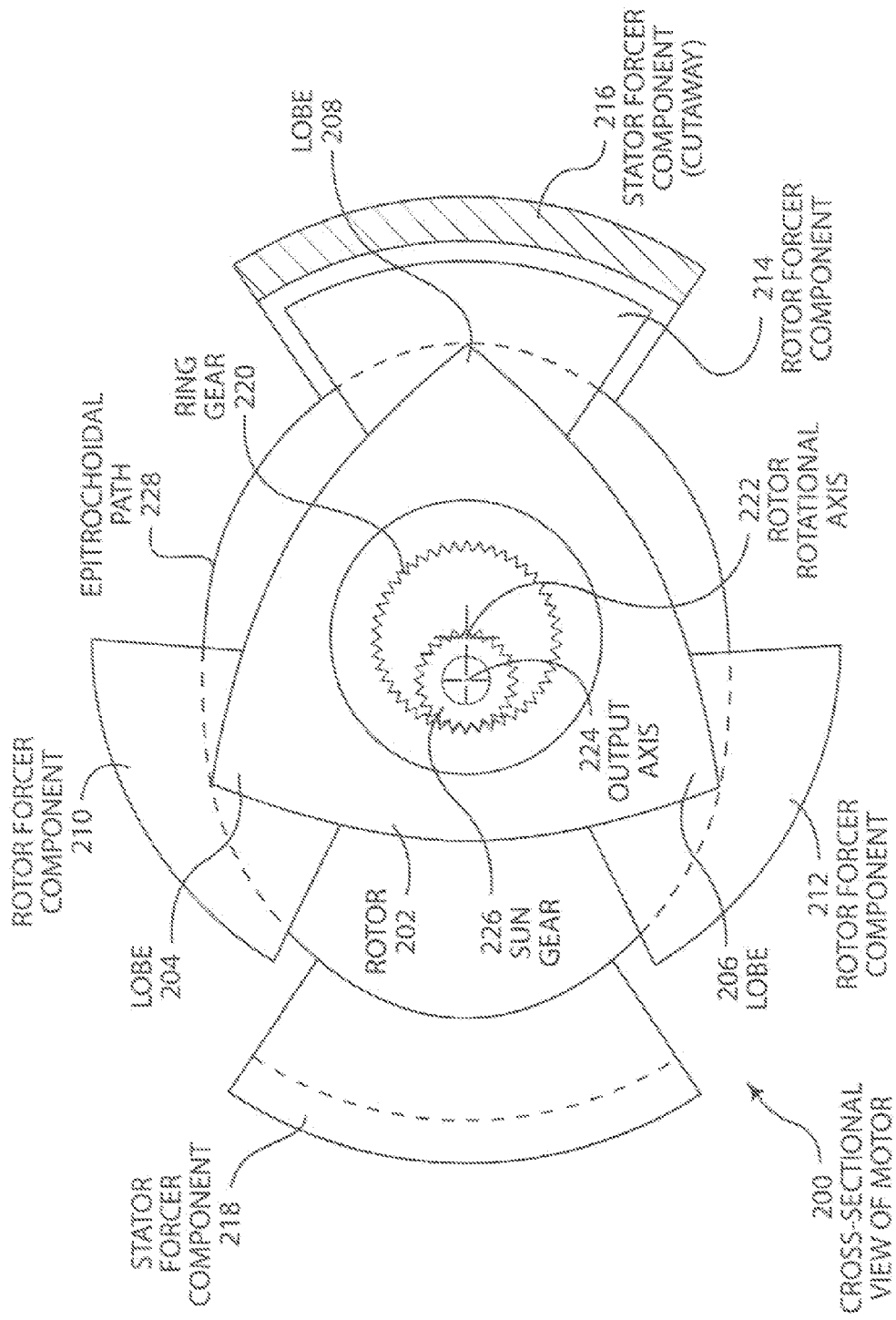
FIG. 2 is a diagram illustration of an embodiment showing a plan view of an electric motor with an epitrochoidal path.

FIG. 2 is a diagram of an embodiment 200 showing a plan view of an electric motor that moves in an epitrochoidal path. Embodiment 200 is an example of a three lobed electric motor similar to embodiment 100 presented earlier in this specification. Embodiment 200 illustrates the position of the various components when the motor is assembled.

A rotor 202 is illustrated with three lobes 204, 206, and 208 and having rotor forcer components 210, 212, and 214 located near the lobes.

Two stator forcer components 216 and 218 are illustrated as being positioned at either end of an epitrochoidal path 228 that may be traveled by the lobes 204, 206, and 208. The stator forcer component 216 is illustrated as being cut away and may be a U-shared stator forcer component such as stator forcer components 116 and 118 illustrated in embodiment 100.

The operation of the electric motor may proceed by the rotor forcer component 214 interacting with the stator forcer component 216 to cause the rotor 202 to rotate. For example, the stator forcer component 216 and rotor forcer component 214 may cause the rotor 202 to rotate clockwise. As the lobe 208 moves downward, the mechanism of the output shaft, the ring gear 220, and the sun gear 226 may cause the lobe 206 and rotor forcer component 212 to advance to engage with the stator forcer component 218, where additional force may be applied to continue turning the rotor 202 clockwise. After the rotor forcer component 212 interacts with the stator forcer component 218, the rotor forcer component 210 may be in position to engage the stator forcer component 216 and continue the motion.

The rotor forcer components are illustrated as being segments that are approximately a sector of a circle. As illustrated, the rotor forcer components may be between a 60 degree and 90 degree sector of a circle. Some embodiments may have smaller rotor forcer components. In some embodiments, the rotor forcer components may be much larger and engage a stator forcer component for a longer portion of a rotation.

Similarly, the stator forcer components 216 and 218 may be illustrated has being between a 60 degree and 90 degree sector of a circle. Some embodiments may have smaller rotor forcer components. In some embodiments, the stator forcer components may be much larger and engage a rotor forcer component for a longer portion of a rotation.

In some embodiments, the stator forcer components may extend completely around the epitrochoidal path 228. In such embodiments, the rotor forcer components may be segmented as illustrated or may also be continuous around the rotor 202. Some embodiments may have a continuous rotor forcer component that completely encircles the rotor 202 and may have segmented stator forcer components.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. An electric motor comprising:
   a housing;
   a rotor having a plurality of lobes and a rotor forcer component mounted at each of said plurality of lobes, said rotor having a rotational axis and a rotor plane perpendicular to said rotational axis;
   a mechanism configured to cause said rotor to move in an epitrochoidal path, said epitrochoidal path being within said rotor plane; and
   a stator mounted to said housing, said stator comprising stator forcer components mounted along said epitrochoidal path.

2. The electric motor of claim 1, said stator component being configured to induce eddy currents in said rotor forcer component.

3. The electric motor of claim 2, said rotor forcer component having at least one planar face substantially parallel to said rotor plane.

4. The electric motor of claim 3, said stator component comprising a U-shaped channel in which said rotor forcer component passes.

5. The electric motor of claim 1, said stator component and said rotor forcer component comprising a direct current forcer.

6. The electric motor of claim 1, said stator component and said rotor forcer component comprising an alternating current forcer.

7. The electric motor of claim 1, said stator component comprising a plurality of magnets.

8. The electric motor of claim 7, said magnets being electromagnets.

9. The electric motor of claim 1, said rotor forcer component comprising a plurality of magnets.

10. The electric motor of claim 9, said magnets being electromagnets.

11. The electric motor of claim 1, said rotor further comprising a slip ring.

12. The electric motor of claim 1, said mechanism comprising:
    a driveshaft having an output axis and an eccentric lobe, said eccentric lobe having an eccentric axis parallel to and offset from said output axis;
    said rotor being mounted on said eccentric lobe such that said rotor axis is coaxial with said eccentric axis;
    a sun gear mounted to said housing; and
    a ring gear mounted to said rotor and engaged to said sun gear.

13. The electric motor of claim 1 further comprising:
    a sensor configured to determine rotational movement of said electric motor and produce an output signal; and
    a controller configured to receive said output signal and control said electric motor in response to an input signal.

14. The electric motor of claim 13, said sensor being mounted to detect rotational movement of said rotor.

15. The electric motor of claim 13, said sensor being mounted to detect rotational movement of said output shaft.

16. The electric motor of claim 13, said sensor being a hall effect sensor.

17. The electric motor of claim 13, said input signal defining a rotational speed.

18. The electric motor of claim 13, said input signal defining a rotational position.

19. An electric motor comprising:
    a housing;
    a first rotor having three lobes and a rotor forcer component mounted at each of said three lobes, said first rotor having a first rotational axis and a first rotor plane perpendicular to said rotational axis;
    a mechanism configured to cause said first rotor to move in an epitrochoidal path, said epitrochoidal path being within said first rotor plane and having two lobes, said mechanism comprising:
      a driveshaft having an output axis and an eccentric lobe, said eccentric lobe having an eccentric axis parallel to and offset from said output axis;
      said first rotor being mounted on said eccentric lobe such that said first rotor axis is coaxial with said eccentric axis;
      a sun gear mounted to said housing; and
      a ring gear mounted to said rotor and engaged to said sun gear.

20. The electric motor of claim 19 further comprising:
    a second rotor having three lobes, said rotor forcer component being mounted on each of said three lobes, said second rotor having a second rotational axis and a second rotational plane perpendicular to said second rotational axis;
    said second rotor being positioned within said housing such that said second rotational axis is parallel to said first rotational axis and said first rotor plane is parallel to and offset from said second rotor plane.

* * * * *